though even in most cases the
United States Patent Office
3,177,886
Patented Apr. 13, 1965

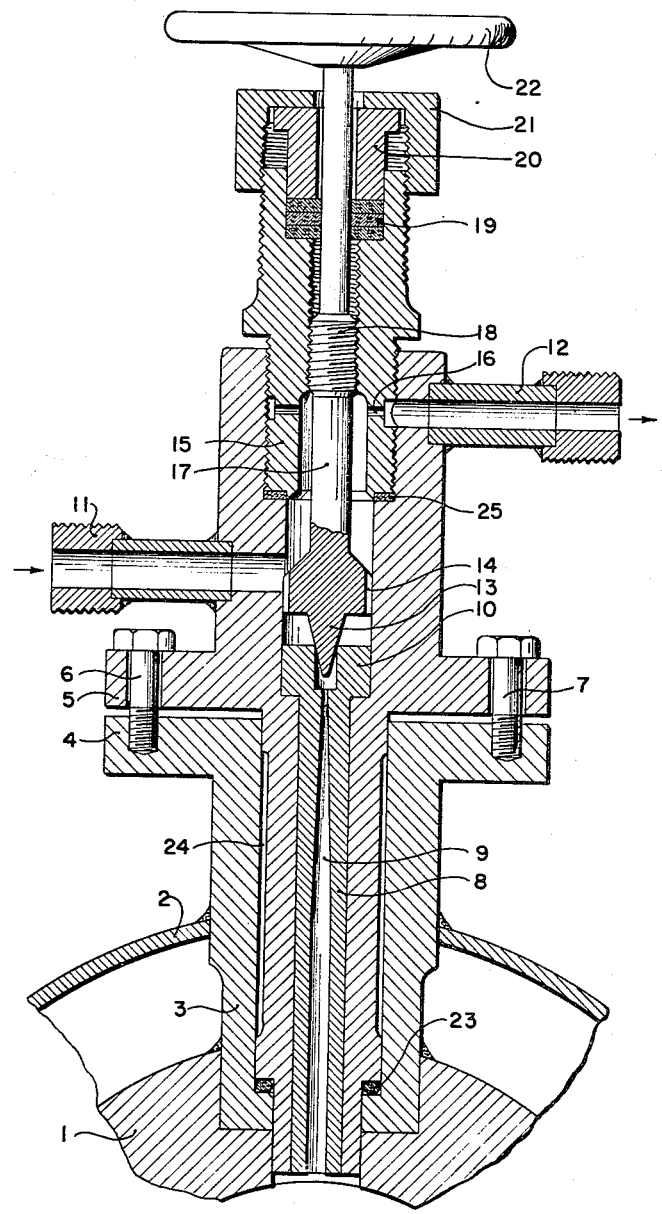

3,177,886
METERING METHOD
Jan Bosman, Arnhem, Netherlands, assignor to American Enka Corporation, Enka, N.C., a corporation of Delaware
Filed Sept. 19, 1962, Ser. No. 224,806
Claims priority, application Netherlands, Oct. 2, 1961, 269,831
3 Claims. (Cl. 137—3)

This invention relates generally to a method for metering a liquid additive under pressure to a liquid having laminar flow and more particularly for metering a liquid additive into a liquid having a solidifying point which is higher than that of the additive while preventing reverse flow of the solutions. The invention also relates to a method for mixing the liquid and the additive thus brought together.

When metering a liquid additive under pressure to a main liquid having laminar flow, generally no difficulties are to be expected if both the additive and the main liquid have a perfectly constant rate of flow, liquid pressure, and flow pattern. In practice, however, such an ideal situation never prevails for very long periods of time. When these ideal conditions of metering under pressure deviate, the metering process more than likely will be disturbed. A possible deviation giving rise to serious disturbance is a temporary pressure drop in the additive relative to the pressure of the main liquid so that the main stream may enter the supply line of the additive and cause fouling. The situation becomes even worse if the liquid penetrated cools down and solidifies in the additive supply line, or in accessories or pumps associated therewith. This may result in serious clogging of the piping system for the additive requiring extensive shutdown and maintenance.

It should be noted also that although in most cases the penetration of main stream liquid into the piping system for the additive is due to a pressure drop, such penetration may also have other causes. This is one of the reasons why a previously proposed solution appears to be inadequate. This solution consisted in placing an automatic pressure valve at the end of the additive supply line which theoretically would close upon a drop in the additive pressure. Insofar as known, however, this system has not yet performed satisfactorily.

Other drawbacks to the previously proposed solution consist in the undesirability of having an additional mechanism in the additive supply line, particularly high pressures required to keep the valve open, and the valve clogging due to an agglomeration of dirt. All the above-mentioned disadvantages to the known method and those inherent in the previously proposed solution do not occur if use is made of the system to be described herein.

An object of the present invention is to provide a metering process not having the disadvantages enumerated hereinabove.

Another object of this invention is to provide a metering method and valve system particularly adaptable for adding molten material having a relatively low solidification point to molten material having a higher solidification point.

Still another object of the present invention is to provide a valving arrangement permitting unilateral flow of one material into another but which automatically prevents reverse flow without resort to moving parts or valve seal mechanisms.

These objects may be accomplished in accordance with this invention by introduction of the additive through an expanding channel and by cooling the channel so that at the narrowest end the temperature is lower than the melting point of the main or laminar flow liquid.

The effect of the foregoing is as follows. If for some reason liquid of the main stream penetrates the additive supply line, the stream of penetrating liquid will be reduced in volume towards the narrowest end of the additive supply channel. At the same time, the penetrating liquid is cooled down such that at the foremost part thereof the temperature is below the melting point of the liquid. At this point the liquid will solidify to a plug, which is pressed firmly against the channel wall by the liquid following thereafter. The plug thus closes the supply line for the additive so that the main stream liquid cannot flow any further. Consequently, said liquid is prevented from reaching valves, pumps, and the like. This general principle of freezing polymer to discontinue the flow thereof is described in German patent application No. 1, 012,426, published July 18, 1957, (U.S. Patent No. 2,771,903) and in Netherlands patent application No. 115,666, dated January 26, 1944. These disclosures, however, do not contain the novel features about to be described.

If pressure of the additive subsequently rises, the additive will push the plug of solidified main material through the expanding channel and the plug will again melt because of re-exposure to high temperature of the main stream. Since the channel in which the plug was present has an expanding shape, the unplugging occurs without any difficulty. It has been found that with this system, the supply stream line for the additive is completely protected from clogging from any cause whatsoever.

The invention has been found to be of particular importance when applied to mixing of the liquid additive and main stream. To obtain a product homogeneous over a period of time, it is essential that the additive be metered as uniformly and smoothly as possible. This is achieved by bringing the two substances together in the above-described manner and subsequently passing them through any known type of liquid mixer. In this connection, and according to the invention, very good results are obtained not only upon adding a plasticizer or a release agent, for example, but also by a method in which the liquid additive is a dispersion of a pigment added to a melt of thermoplastic polymer.

The invention also relates to an apparatus for carrying out the above-described methods comprising a heated line for the main stream, a branch line for the additive discharging into the main line, and a metering pump and/or manual control valve in the branch line. As indicated earlier, the branch line should have such a shape that it expands as far as its mouth and over part of its length, and should be connected to a cooling system at least near the point where the line begins to expand. The cooling system may comprise a cooling jacket or a system of cooling fins or surfaces and, moreover, may be so constructed that the heating system which is provided around the remainder of the apparatus does not include the expanding branch line. This expanding part may have various shapes. However, all these shapes must permit loosening and easy removal of a plug of solidified material formed in the expanding part. In this connection, the simplest shape for the expanding part of the branch line, and the preferred arrangement according to the invention, is in the form of a cone.

As mentioned before, the apparatus described may be used very advantageously as a system for feeding liquids to be mixed to a liquid mixer. Moreover, the invention relates to the shaped products made of a material obtained in the liquid state by the above-described mixing method. These shaped products are remarkable in being far more homogeneous than those produced heretofore. Examples of such shaped products are colored synthetic threads or supple articles of a plastic material containing a plasticizer and/or a release agent.

Other objects and more advantages will become apparent to those skilled in this art upon study of the following detailed disclosure coupled with the attached drawing wherein the figure illustrates in vertical or elevational cross section a preferred form of unilateral metering system permitting introduction of a liquid additive from a branch line into a solution of main liquid of relatively larger quantity and of relatively higher solidification point.

With attention now directed to the drawing, reference numeral 1 identifies the cylindrical housing of a liquid mixer, only part of which is shown, through which housing a hot viscous liquid is passed transverse to the plane of the drawing. In a given application of the apparatus the liquid may be the melt of a nylon polymer, although the invention of course may be used with other solutions. The cylinder is surrounded by a jacket 2 and a heating medium may be circulated between these elements for maintaining the proper temperature. Mounted liquid-tight in the cylinder 1 and through the jacket 2 there is a bored journal 3 provided with a flange 4. In this journal may be inserted the cylindrical, lower end of the bored housing 5. Bolts 6 and 7 serve to secure the flange of this housing to the flange 4 of journal 3. Ring 23 of packing material serves to maintain a liquid-tight seal.

A tubular sleeve 8 is pressed in the bore of the housing 5. Channel 9 of tube 8 is slightly conical at the upper or entrance extremities, as shown. At the top of the tube 8 is constructed a valve seat 10 which receives and cooperates with needle valve 13 supported by stem 17. Attached in the upper part of the housing 5 is an additive supply line 11 and an overflow or return line 12. The needle valve 13 is guided within the bore of housing 5 by three fins 14. By raising or retracting the needle valve 13 with its stem 17, the back of the needle valve may be caused to bear liquid-tight against a seat of a valve stem guide 15. This guide 15 is retained in the housing 5 by means of a screw thread, threaded plug and a ring of 25 packing material which provides a liquid-tight seal. Four passages are also provided to permit communication between the supply and overflow lines when the valve 13 is lowered.

The valve stem 17 may be raised and lowered by a hand wheel 22. To this end both the valve stem 17 and the valve stem guide are provided with screw threads 18. The valve stem 17 is mounted in a known liquid-tight manner with the aid of packing rings 19, gland 20, and a packing nut 21 which may be screwed on the valve stem guide 15. In order to insulate the housing 5 as well as possible from the heated journal 3, the housing is additionally lathed over a great part of the length fitting within the journal, as a result of which a space 24 is formed.

*Operation*

When the needle valve 13 is in its lowest position, a pigment or other dispersion may be fed under pressure through the lines 11 and 12 by a pumping system (not shown). In a similar manner a release agent or a plasticizer may be fed through these lines. When the needle valve is subsequently raised to its highest position, then the overflow line 12 is shut off and the additive flows through the conically expanding channel 9 to the cylinder 1, pushing ahead of it a plug of polymer, if present therein. It is obvious that the pressure exerted on the additive must be sufficiently high for this purpose. The channel 9 will now allow the passage of the additive, which may subsequently flow into the cylinder 1 and mix with the polymer melt.

If polymer should penetrate into the channel 9 because of a pressure drop in the additive, the polymer will solidify to a plug in the conical section. It will be clear that this is due to positioning of the channel section outside the heating jacket 2 and radiation of heat from the channel section to the housing 5, only a very small part of which is heated. The shape of the apparatus may be adapted to the nature of the polymer so that the penetrating polymer will always solidify in the channel 9.

With a variant embodiment of the apparatus (not shown), the upper part of the housing 5 may be provided with a cooling jacket or with cooling fins so that the temperature of the channel 9 may be brought to any desired value. The plug of solidified polymer shuts off the channel 9 so that the polymer cannot penetrate any farther. If, subsequently, the pressure of the additive rises, then the conical shape of the channel causes the plug to be again pressed into the cylinder 1 without any difficulty. It has been found that this construction obviates any disturbance heretofore known to exist in the metering process.

Inasmuch as other modifications will become apparent to those skilled in this art, it is intended that the scope of the present invention be limited only to the extent set forth in the following claims.

What is claimed is:

1. A method for metering a liquid additive under pressure to a main solution of liquid having laminar flow and having a solidification point higher than that of the additive comprising the steps of passing said liquid additive in the direction of said main liquid solution through a restricted zone which expands immediately prior to communication with the main solution, and heating said main solution of liquid to a temperature higher than the solidification point thereof and higher than the temperature of said restricted zone, thereby preventing reverse flow of said main solution into said liquid additive.

2. A method for metering a liquid additive under pressure to a main solution of liquid having laminar flow and having a solidification point higher than that of the additive comprising the steps of flowing said liquid additive into said main solution through a zone having inlet and discharge ends, restricting the flow of additive at the inlet end of said zone, gradually relieving the aforesaid restriction toward and at the discharge end of said zone, and heating said main solution of liquid to a temperature higher than the solidification point thereof and higher than the temperature at the inlet end of said zone to prevent reverse flow of said main solution into said additive in the event of pressure drop in the additive.

3. A method as set forth in claim 2 wherein a dispersion of pigments constitutes said liquid additive, and wherein a melt of thermoplastic polymer constitutes said main liquid solution.

References Cited by the Examiner

UNITED STATES PATENTS 2,771,903 11/56 Notarbartolo et al. _____ 137—341
2,840,110 6/58 Parsons _____ 137—625.27

M. CARY NELSON, *Primary Examiner.*